Figure 1:
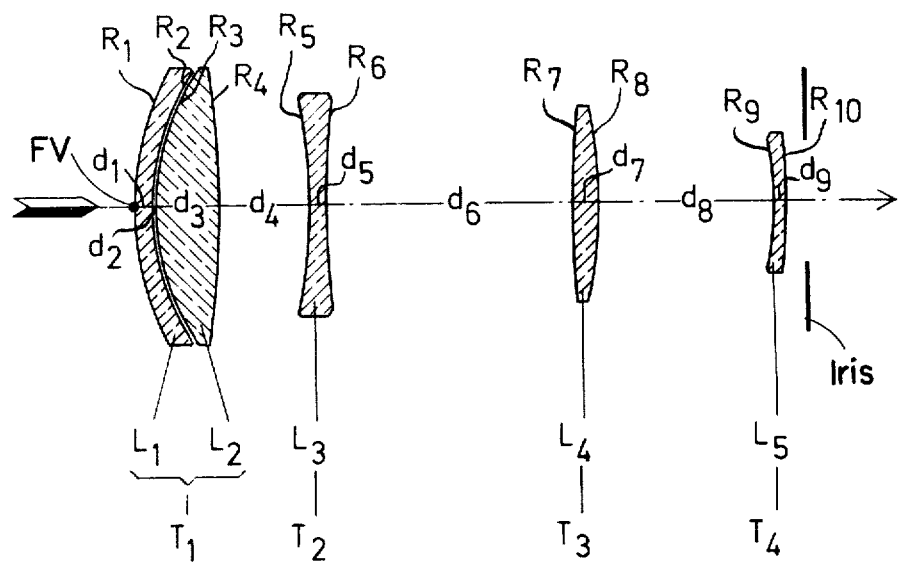
Figure 2:
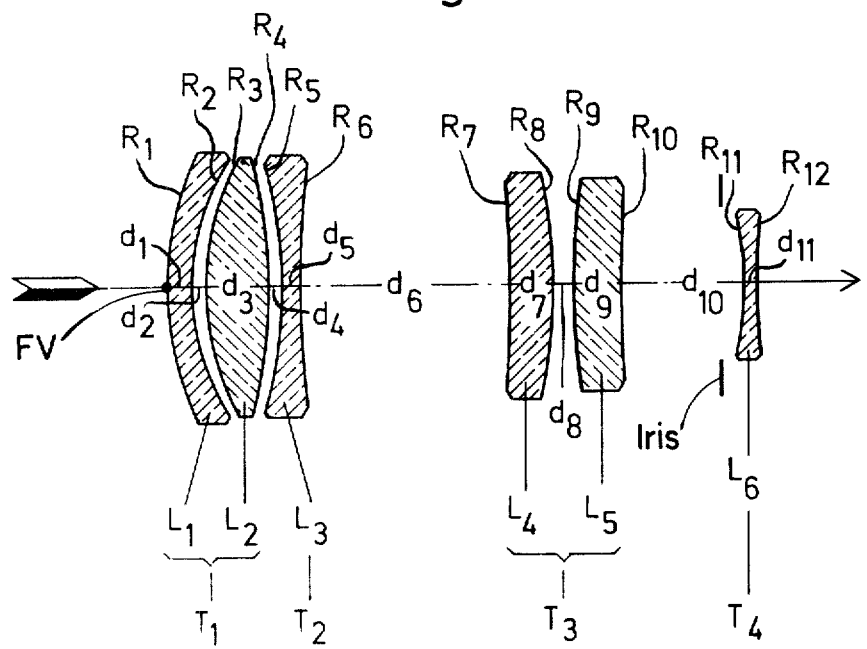
Figure 3:
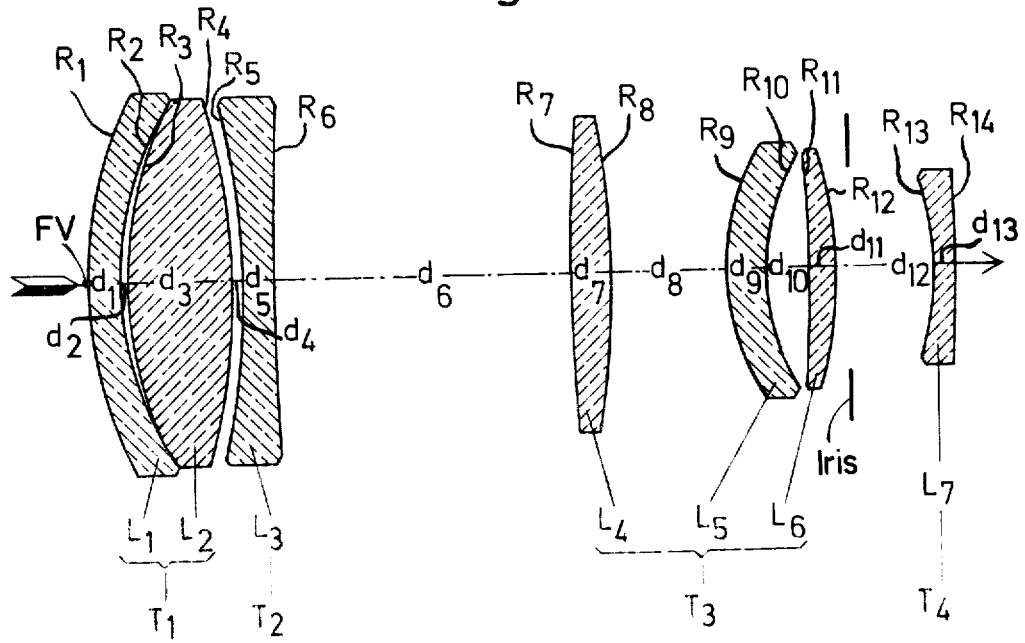
Figure 4:
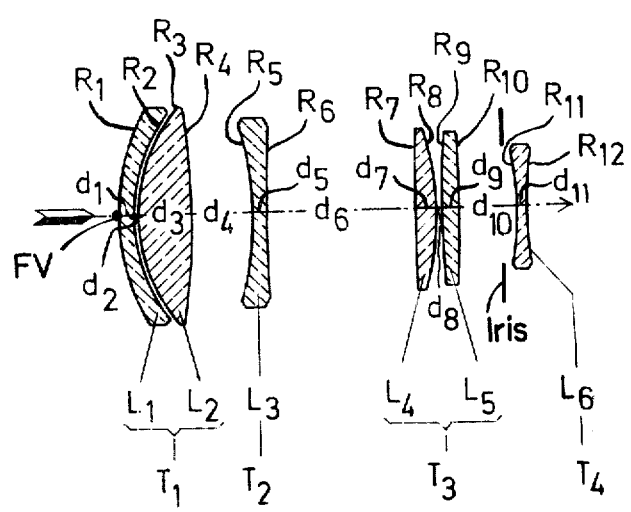
Figure 5:
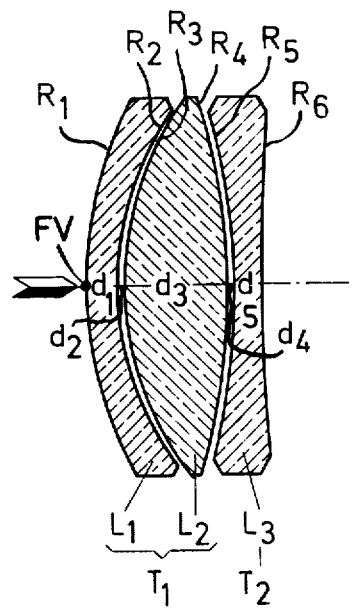
Figure 5:
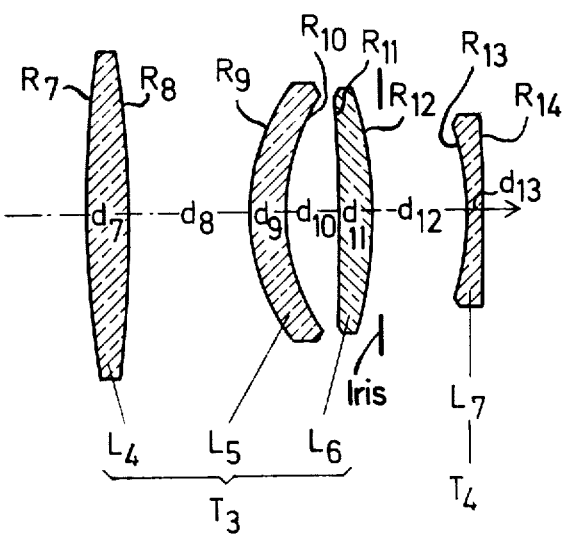

United States Patent
Determann et al.

[11] 3,883,229
[45] May 13, 1975

[54] TELEPHOTO LENS OBJECTIVE

[75] Inventors: Fritz Determann, Oberkochen; Heinz Zajadatz, Aalen, both of Germany

[73] Assignee: Carl Zeiss-Stiftung, Oberkochen, Germany

[22] Filed: Feb. 14, 1973

[21] Appl. No.: 332,416

[30] Foreign Application Priority Data
Feb. 22, 1972 Germany............ 2208163

[52] U.S. Cl. ............. 350/214; 350/215; 350/216
[51] Int. Cl. ............................................ G02b 9/00
[58] Field of Search ............ 350/214, 215, 216

[56] References Cited
UNITED STATES PATENTS

| | | | |
|---|---|---|---|
| 2,778,272 | 1/1957 | Reymond | 350/214 |
| 3,160,699 | 12/1964 | Yamji | 350/214 |
| 3,369,853 | 2/1968 | Tolle | 350/215 |

Primary Examiner—Ronald L. Wibert
Assistant Examiner—Conrad Clark
Attorney, Agent, or Firm—Nichol M. Sandoe

[57] ABSTRACT

The invention contemplates a telephoto-lens construction comprising four parts, one or more of which is a multiple-element part, and so devised as to achieve superior achromatic quality over a wide field of view, within a structural length which is less than the focal length. This result is achieved by following a particular schedule of regions from which to select optical glasses for the respective parts, or for the respective multiple elements of one or more of such parts, and by forming lens elements with such selected glasses in accordance with a particular schedule of refractive powers.

11 Claims, 7 Drawing Figures

TELEPHOTO LENS OBJECTIVE

The present invention relates to a telephoto lens formed of a converging part of the system which faces the side of the longer ray distance, followed by a diverging part, a converging part following same at a larger distance away, and then finally again a diverging part.

Telephoto lenses of the indicated type make it possible to reduce the structural length to values considerably less than the focal length of the lens. The expression "structural length" as used herein is to be taken to mean the distance of the image plane from the first vertex of the first lens element in the system.

Constructions of this type known up to the present time exhibit typical errors with respect to color correction, which errors limit their use. As is known, in lenses of long focal length, the secondary color spectrum of the longitudinal aberrations as well as that of the transverse aberrations is always very disturbing. It is even larger, and therefore more apparent, in the known tele-lenses of shortened structural length than in simple achromatics or apochromatics of the same focal length but larger structural length.

The object of the present invention is to provide a tele-lens of improved quality by eliminating the secondary color spectrum which constitutes the decisive disadvantage of the known types of tele-lenses. At the same time, it is an object to obtain monochromatic correction of equivalent quality, for such relative apertures as are ordinarily expected for the corresponding focal lengths.

These objects are obtained in accordance with the invention by a special, unorthodox manner of selecting optical materials, which will hereinafter be referred to generally as "glasses", in combination with an advantageous distribution of refractive powers. The glasses are selected in particular on the basis of their relative individual dispersions $P^{**}$ in the blue portion and $P^*$ in the red portion of the spectrum. In this connection, we have $P^{**} = N_F - N_i / N_F - N_C$ and $P^* = N_F - N_d / N_F - N_C$ in which N is the index of refraction and the subscripts designate the wavelengths of light in accordance with the Schott catalog. The characterizing of the glasses on basis of $P^{**}$ and $P^*$ has been established by Herzberger. He also sets forth rules as to how the secondary spectrum of a lens can be entirely eliminated in the paraxial region by means of this characterization (superachromasia). Together with Pulvermacher, he gives further rules as to how the paraxial difference in enlargement can also be corrected. These rules, however, relate only to the correction of paraxial errors. Other errors such as, for instance, spherically chromatic aperture errors (Gauss errors) are not affected thereby. Since, however, a superachromatic correction on the axis is only meaningful in combination with an extremely good correction of all other picture defects such as spherical aberration, image shell curvature, astigmastism, coma and distortion in the entire picture field, both monochromatically and in particular chromatically, and possibly even superachromatically, the said rules of Herzberger and Pulvermacher are not sufficient for the production of a lens which meets demands for highest quality and, accordingly, are used only in special cases where very small picture fields are to be corrected. Thus, particularly in the case of the known lenses with longer focal lengths, the large secondary spectrum has up to now so greatly overlapped a high monochromatic correction, obtained possibly at high expense, that such an expense can be considered meaningless for the monochromatic correction, inasmuch as this secondary spectrum exists not only in the center of the picture but in particular for all lateral picture errors in different forms of appearance, and, as a matter of fact, to a good part entirely independently of any good color correction possibly present on the axis. Here, there actually exists another deficiency for which the present invention for the first time provides a satisfactory remedy.

In accordance with the present invention, there are used for the construction of the said tele-lenses as a rule only optical materials selected from the following five very small ranges of the $P^{**} - P^*$ glass ranges:

| | | |
|---|---|---|
| Range 1: | $P^{**} = -1.933 \pm 0.021$ | $P^* = 1.749 \pm 0.010$ |
| Range 2: | $P^{**} = -1.724 \pm 0.021$ | $P^* = 1.787 \pm 0.010$ |
| Range 3: | $P^{**} = -1.863 \pm 0.021$ | $P^* = 1.765 \pm 0.010$ |
| Range 4: | $P^{**} = -2.091 \pm 0.021$ | $P^* = 1.727 \pm 0.010$ |
| Range 5: | $P^{**} = -1.925 \pm 0.021$ | $P^* = 1.751 \pm 0.010$ |

With regard to the relative size of the five ranges, it may be mentioned that the width of variation of the values of all Schott glasses range for $P^{**}$ from $-2.24$ to $-1.698$ and for $P^*$ from $1.65$ to $1.90$.

All powers of the individual lenses which enter into question must be adapted to the glass selected, and the ratio of structural length to focal length desired also influences the powers. The powers can be derived from the refractive-power characteristics A, B, C, D, E, which for this purpose are divided by the structural length desired. In this connection, the inventive quality results only if the following power characteristics are complied with (for a.refractive power of the entire system of 1.0):

A = −0.74 ± 0.18
B = +3.08 ± 0.57
C = −2.35 ± 0.59
D = +2.63 ± 0.56
E = −2.90 ± 0.69

Figure 6:
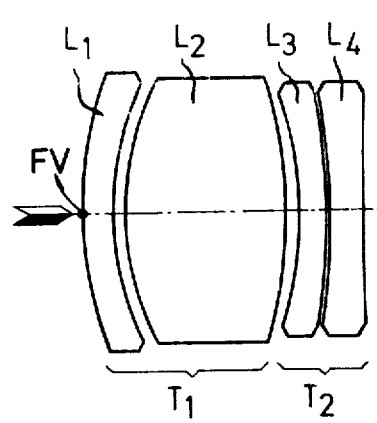
Figure 6:
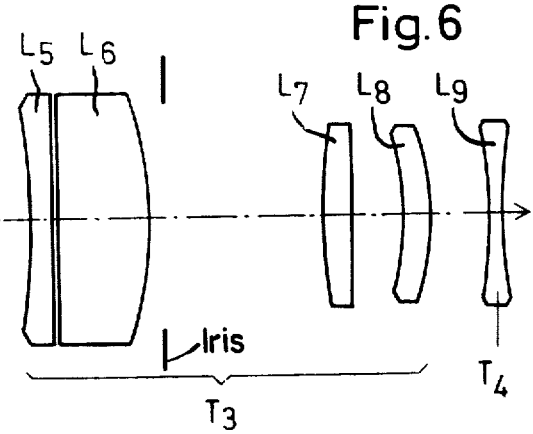
Figure 7:
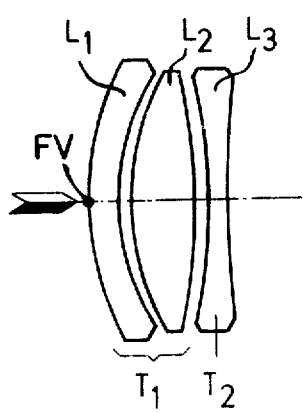
Figure 7:
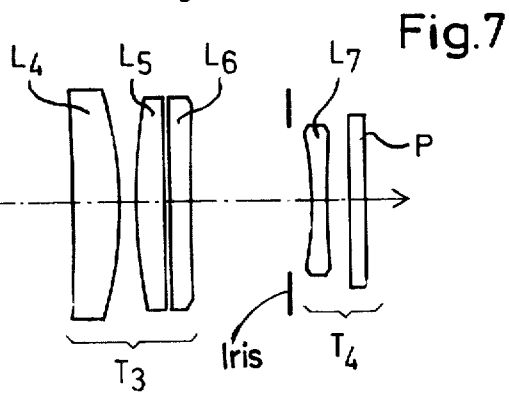

The invention is illustrated by five specific examples provided at the end of this specification, and the accompanying FIGS. 1 to 5 are optical diagrams which respectively apply to these five examples. The remaining FIGS. 6 and 7 are similar diagrams, illustrating systems as in FIGS. 1 to 5 and having additional combining elements. In all diagrams, the first vertex is indicated by a heavy dot, with the legend FV, and the diaphragm location is labeled Iris.

In general, tele-lens systems of the invention comprise four parts, some of which may be made of multiple elements; these four parts are consistently designated with the respective legends $T_1$, $T_2$, $T_3$, $T_4$. In the first part ($T_1$), as seen in the direction of the path of the light, there is first of all provided a diverging member, primarily of glass of range 1, with a refractive power proportional to A; this is followed by a converging member, primarily of glass from range 2, with a refractive power proportional to B. Part 2 ($T_2$) then follows, being a diverging member (or members) of glass, primarily from range 3, with a power of refraction proportional to C. This is followed at a larger distance away by part 3 ($T_3$) in the form of a converging member (or members) of glass, taken primarily from range 4, with a refractive power proportional to D. Finally, at a still greater distance away, part 4 ($T_4$) follows, being a diverging member (or members) of glass, primarily from range 5, with a refractive power proportional to E. The proportionality factor for the refractive power characteristics A, B, C, D, E is always the reciprocal of the structural length.

For better compensation of the errors of higher order, it is often suitable to provide individual members of the above enumeration not only by using glasses selected from the glass ranges primarily indicated for the purpose, but also by additionally using associated weaker lenses selected from among the other four indicated glass ranges; such associated lenses in themselves or together with other lens elements of the particular part may also be secured at cemented adjacent surfaces (as for example at $d_2$, between adjacent surfaces $R_2$-$R_3$ in FIG. 1), but they always fall within the limits of the stated refractive power for the particular part, as will be seen from the accompanying diagrams for the respective illustrative examples given below. For instance, it is advantageous, for a larger angle of view and for a larger relative aperture, to make part 3 ($T_3$) from two or more lens elements of the above-indicated glass ranges; thus, for two disclosed embodiments of the invention, it has been satisfactory to provide a part 3 ($T_3$) lens of refractive power D by using a first converging lens of glass of range 4 with refractive power $D_1$ and a following second converging lens of glass or range 3 with the refractive power $D_2$, where $D_1 + D_2$ is proportional to D. In two other embodiments of the present invention, part 3 ($T_3$) is split to comprise three elements, namely, converging lens of glass of range 4 with refractive power $D_1$, a subsequent meniscus-shaped lens of glass of range 3 (with the curvature towards the incident light) with refractive power $D_2$, and a following converging lens of glass or range 2 with the refractive power $D_3$, where $D_1 + D_2 + D_3$ is again proportional to D. Very slightly refractive associated lenses can in exceptional cases be prepared without great damage to superachromatism in favor of other effects using glasses of other ranges, as illustrated by Example 2.

For each part of the objective lens, there is the possibility of cementing the lens elements together; additionally, a cement surface between part 1 ($T_1$) and part 2 ($T_2$) is also possible. It is also possible in all parts ($T_1$ ... $T_4$) to simulate the properties of the glasses indicated for these parts by free-standing or cemented combinations of two or more glasses which may be of one or more entirely different ranges. These possibilities necessarily result from the invention, as illustrated by Examples 1 and 2.

The tables below indicate the design data for five Examples, designated I to V, in support of the elements of the claims and their practical realization, as further illustrated by FIGS. 1 to 5, respectively. In all these figures of the drawings, the radii R entered bear as subscripts the numbering of the optical areas in the data tables. Lens thicknesses and air spaces are designated by (d) and are also provided with subscripts in the same continuous numbering as the data tables. Furthermore, the individual lens elements in each system are designated L, and the numbering of the subscripts for L corresponds to the arrangement of the lenses in the direction of the incident light. Further, as already explained, there are indicated in the figures what lenses or lens combinations represent the individual members $T_1$ to $T_4$ of each particular telephoto-lens system.

For the embodiments of the invention shown in FIGs. 6–7, more abbreviated data tables are appended. These figures merely show possibilities of combining weaker lenses or flat plates P for the construction of lens systems from the preferred glass ranges or the combination of glasses of still further ranges to obtain the properties of the glasses indicated.

Example I

Focal length = 1.0
Back focus = 0.4480
Structural length = 0.8226
Relative aperture = 1:6.3
Half of angular field = 3.7°

| Areas | Radii | Thicknesses | Glass | P** | P* | Lens | Part | Glass range No. | Lens refractive powers × structural length for color d | Refractive power characteristics range |
|---|---|---|---|---|---|---|---|---|---|---|
| 1 | .17329 | .012897 | LaFN 8 | −1.9321 | 1.7489 | 1 | 1 | 1 | −.765216 | A |
| 2 | .13765 | .000512 | | | | | | | | |
| 3 | .13667 | .036726 | Fluor-spar | −1.7237 | 1.7873 | 2 | | 2 | 3.282835 | B |
| 4 | −.48839 | .051843 | | | | | | | | |
| 5 | −.25375 | .010078 | LaF 20 | −1.8623 | 1.7634 | 3 | 2 | 3 | −2.664285 | C |
| 6 | 1.26255 | .140754 | | | | | | | | |
| 7 | 1.35693 | .013153 | F 11 | −2.0746 | 1.7289 | 4 | 3 | 4 | 2.076017 | D |
| 8 | −.29943 | .102149 | | | | | | | | |
| 9 | −.16010 | .006491 | LF 8 | −1.9217 | 1.7519 | 5 | 4 | 5 | −2.217200 | E |
| 10 | −.68992 | | | | | | | | | |

"Color d" in this and all tables refers to Helium-line d, at 587.6 mμ.

Example II

Focal length = 1.0
Back focus = .4926
Structural length = .8875
Relative aperture = 1:5.6
Half of angular field = 8.5°

| Areas | Radii | Thicknesses | Glass | P** | P* | Lens | Part | Glass range No. | Lens refractive powers × structural length for color d | Refractive power characteristics range |
|---|---|---|---|---|---|---|---|---|---|---|
| 1 | .20500 | .018213 | LaFN 8 | −1.9321 | 1.7489 | 1 | 1 | 1 | −.563798 | A |
| 2 | .16759 | .006805 | | | | | | | | |
| 3 | .17249 | .044232 | Fluor-spar | −1.7237 | 1.7873 | 2 | | 2 | 3.317877 | B |

Example II — Continued

| | | |
|---|---|---|
| Focal length | = | 1.0 |
| Back focus | = | .4926 |
| Structural length | = | .8875 |
| Relative aperture | = | 1:5.6 |
| Half of angular field | = | 8.5° |

| Areas | Radii | Thicknesses | Glass | P** | P* | Lens | Part | Glass range No. | Lens refractive powers × structural length for color d | Refractive power characteristics range |
|---|---|---|---|---|---|---|---|---|---|---|
| 4 | −.32723 | .008006 | | | | | | | | |
| 5 | −.29588 | .013410 | LaF 20 | −1.8623 | 1.7634 | 3 | 2 | 3 | −2.462950 | C |
| 6 | 1.48328 | .138501 | | | | | | | | |
| 7 | −1.81388 | .030822 | F 11 | −2.0746 | 1.7289 | 4 ⟩ 3 | | 4 | $1.491605 = D_1$ | * D |
| 8 | −.30895 | .012609 | | | | | | | | |
| 9 | .51862 | .032824 | LaF 20 | −1.8623 | 1.7634 | 5 | | 3 | $.901938 = D_2$ | |
| 10 | 2.21882 | .081259 | | | | | | | | |
| 11 | −.20948 | .008206 | LF 8 | −1.9217 | 1.7519 | 6 | 4 | 5 | −3.000638 | E |
| 12 | .83385 | | | | | | | | | |

* $D_1 + D_2 = 2.393543$

EXAMPLE III

| | | |
|---|---|---|
| Focal length | = | 1.0 |
| Back focus | = | .4018 |
| Structural length | = | .9793 |
| Relative aperture | = | 1:4 |
| Half of angular field | = | 8.5° |

| Areas | Radii | Thicknesses | Glass | P** | P* | Lens | Part | Glass range No. | Lens refractive powers × structural length for color d | Refractive power characteristics range |
|---|---|---|---|---|---|---|---|---|---|---|
| 1 | .27517 | .023522 | LaFN 8 | −1.9321 | 1.7489 | 1 ⟩ 1 | | 1 | −.581383 | A |
| 2 | .21699 | .005001 | | | | | | | | |
| 3 | .22659 | .069007 | Fluor-spar | −1.7237 | 1.7873 | 2 | | 2 | 2.785419 | B |
| 4 | −.42376 | .009281 | | | | | | | | |
| 5 | −.40584 | .019002 | LaF 20 | −1.8623 | 1.7634 | 3 | 2 | 3 | −1.958457 | C |
| 6 | 2.18543 | .200821 | | | | | | | | |
| 7 | 1.33990 | .025403 | TiF 5 | −2.1090 | 1.7312 | 4 ⟩ 3 | | 4 | $1.187766 = D_1$ | * D |
| 8 | −.76456 | .075128 | | | | | | | | |
| 9 | .15365 | .026163 | LaF 20 | −1.8623 | 1.7634 | 5 | | 3 | $.121210 = D_2$ | |
| 10 | .14714 | .027283 | | | | | | | | |
| 11 | −.90101 | .018002 | Fluor-spar | −1.7237 | 1.7873 | 6 | | 2 | $1.104415 = D_3$ | |
| 12 | −.27123 | .065287 | | | | | | | | |
| 13 | −.17113 | .013601 | LF 8 | −1.9217 | 1.7519 | 7 | 4 | 5 | −2.780549 | E |
| 14 | −1.26501 | | | | | | | | | |

* $D_1 + D_2 + D_3 = 2.413391$

Example IV

| | | |
|---|---|---|
| Focal length | = | 1.0000 |
| Back focus | = | 0.5077 |
| Structural length | = | 0.8477 |
| Relative aperture | = | 1:5.6 |
| Half of angular field | = | 5.4° |

| Areas | Radii | Thicknesses | Glass | P** | P* | Lens | Part | Glass range No. | Lens refractive powers × structural length for color d | Refractive power characteristics range |
|---|---|---|---|---|---|---|---|---|---|---|
| 1 | .19218 | .014321 | LaFN 8 | −1.9321 | 1.7489 | 1 ⟩ 1 | | 1 | −.885184 | A |
| 2 | .14620 | .000326 | | | | | | | | |
| 3 | .14516 | .043891 | Fluor-spar | −1.7237 | 1.7873 | 2 | | 2 | +3.111989 | B |
| 4 | −.57788 | .050863 | | | | | | | | |
| 5 | −.29807 | .013293 | LaF 20 | −1.8623 | 1.7634 | 3 | 2 | 3 | −2.156420 | C |
| 6 | 2.73377 | .124650 | | | | | | | | |
| 7 | 3.64420 | .016052 | TiF 5 | −2.1090 | 1.7213 | 4 ⟩ 3 | | 4 | $+1.846159 = D_1$ | * D |
| 8 | −.29384 | .005142 | | | | | | | | |
| 9 | .78186 | .014622 | LaF 20 | −1.8623 | 1.7634 | 5 | | 3 | $+1.245144 = D_2$ | |
| 10 | −1.13650 | .049158 | | | | | | | | |
| 11 | −.22127 | .007650 | LF 8 | −1.9217 | 1.7519 | 6 | 4 | 5 | −3.462688 | E |
| 12 | .37257 | | | | | | | | | |

* $D_1 + D_2 = +3.091303$

Example V

| | | | | | | | | Glass range No. | Lens refractive powers × structural length for color d | Refractive power characteristics range |
|---|---|---|---|---|---|---|---|---|---|---|
| Area | Radii | Thicknesses | Glass | P** | P* | Lens | Part | | | |
| 1 | 0.27154 | 0.021381 | LaFN 8 | −1.9321 | 1.7489 | 1 | | 1 | −0.644957 | A |
| 2 | 0.21111 | 0.003631 | | | | | >1 | | | |
| 3 | 0.22042 | 0.069386 | Fluor-spar | −1.7237 | 1.7873 | 2 | | 2 | 2.879370 | B |
| 4 | −0.40340 | 0.005244 | | | | | | | | |
| 5 | −0.40340 | 0.017750 | LaF 20 | −1.8623 | 1.7634 | 3 | 2 | 3 | −2.111017 | C |
| 6 | 1.49484 | 0.186375 | | | | | | | | |
| 7 | 0.79339 | 0.026625 | F 11 | −2.0746 | 1.7289 | 4 | | 4 | $1.341541 = D_1$ | |
| 8 | −1.04285 | 0.083909 | | | | | | | | |
| 9 | 0.15271 | 0.023398 | LaF 20 | −1.8623 | 1.7634 | 5 | >3 | 3 | $0.028855 = D_2$ | * D |
| 10 | 0.14417 | 0.035500 | | | | | | | | |
| 11 | −1.10470 | 0.022591 | Fluor-spar | −1.7237 | 1.7873 | 6 | | 2 | $1.200551 = D_3$ | |
| 12 | −0.26961 | 0.063739 | | | | | | | | |
| 13 | −0.17762 | 0.010085 | LF 8 | −1.9217 | 1.7519 | 7 | 4 | 5 | −2.882731 | E |
| 14 | −2.47314 | | | | | | | | | |

* $D_1 + D_2 + D_3 = 2.570947$

Data Table to FIG. 6

| | | P** | P* | Range No. |
|---|---|---|---|---|
| $L_1$ | LaFN8 | −1.9321 | 1.7489 | 1 |
| $L_2$ | Fluorspar | −1.7237 | 1.7873 | 2 |
| $L_3$ | BaF50 | −1.9016 | 1.7484 | − } 3¹ |
| $L_4$ | Lak3 | −1.7989 | 1.7866 | − |
| $L_5$ | TiF5 | −2.1090 | 1.7213 | 4 |
| $L_6$ | F11 | −2.0746 | 1.7289 | 4 |
| $L_7$ | LaF20 | −1.8623 | 1.7634 | 3 |
| $L_8$ | Fluorspar | −1.7237 | 1.7873 | 2 |
| $L_9$ | LF8 | −1.9217 | 1.7519 | 5 |

¹In Combination (like LaF20)

Data Table to FIG. 7

| | | P** | P* | |
|---|---|---|---|---|
| $L_1$ | LaFN8 | −1.9321 | 1.7489 | 1 |
| $L_2$ | Fluorspar | −1.7237 | 1.7873 | 2 |
| $L_3$ | LaF20 | −1.8623 | 1.7634 | 3 |
| $L_4$ | F11 | −2.0746 | 1.7289 | 4 |
| $L_5$ | LaF20 | −1.8623 | 1.7634 | 3 |
| $L_6$ | BaF9 | −1.8748 | 1.7578 | − |
| $L_7$ | LF8 | −1.9217 | 1.7519 | 5 |
| P | Bk7 | −1.7221 | 1.8697 | − |

Focal length = 1.0
Back focus = 0.4093
Structural length = 0.9789
Relative aperture = 1:4
Half of angular field = 8.6°

What is claimed is:

1. A photographic telephoto lens objective, comprising a converging first part facing the side of the longer light distance, a following diverging second part, a converging third part following at a greater distance away, and a final diverging fourth part, characterized by the fact that the optical materials for all lenses with the exception of associated lenses which are almost free of refractive power are selected from five ranges of the P** − P* presentation, in accordance with which:

$$P^{**} = \frac{N_F - N_i}{N_F - N_C}$$

$$P^{*} = \frac{N_F - N_t}{N_F - N_C}$$

where N is the index of refraction and the subscripts F, C, i and t represent the wavelengths of light for the blue and red hydrogen lines and for the ultraviolet and infrared mercury lines, respectively, and that for Ranges 1 to 5 the following limits apply:

Range 1: P** = −1.933 ± 0.021   P* = 1.749 ± 0.010
Range 2: P** = −1.724 ± 0.021   P* = 1.787 ± 0.010
Range 3: P** = −1.863 ± 0.021   P* = 1.765 ± 0.010
Range 4: P** = 2.091 ± 0.021   P* = 1.727 ± 0.010
Range 5: P** = −1.925 ± 0.021   P* = 1.751 ± 0.010, that from the optical materials so selected, lenses or lens groups are formed whose refractive powers, multiplied by the structural length assume refractive power characteristics which, for a refractive power 1.0 for the entire system, are:

A = −0.74 ± 0.18
B = +3.08 ± 0.57
C = −2.35 ± 0.59
D = +2.63 ± 0.56
E = −2.90 ± 0.69, structural length being taken as the distance from the first vertex of the first lens to the image plane of the objective; the first part comprising a first member primarily of material of glass Range 1 and having a refractive power proportional to the value A, and a second member of material primarily from glass Range 2 and having a refractive power proportional to the value B; the second part comprising a member primarily of material of glass Range 3 and having a refractive power proportional to the value C; the third part comprising a member primarily of material of glass Range 4 and having a refractive power proportional to the value D; the fourth part comprising a member primarily of material of glass Range 5 and having a refractive power proportional to the value E; the proportionality factor being the reciprocal of the structural length of the objective.

2. An objective lens according to claim 1, characterized by the fact that the third part consists of a lens of glass Range 4 and having a refractive power proportional to D.

3. An objective lens according to claim 1, characterized by the fact that the third part consists of a first lens element of glass Range 4 with a refractive power proportional to $D_1$ and a second lens element of glass Range 3 with a refractive power proportional to $D_2$, in such manner that $D_1 + D_2 = D$.

4. An objective lens according to claim 1, characterized by the fact the third part consists of a first lens element of glass Range 4 with a refractive power proportional to $D_1$, a following meniscus element which is substantially without refractive power and is arched towards the light, said meniscus element being of glass Range 3 with refractive power proportional to $D_2$, and a following lens element of material from glass Range 2 with a refractive power proportional to $D_3$, in such manner that $D_1 + D_2 + D_3 = D$.

5. An objective lens according to claim 1, in which two parts of the objective lens comprise adjacent multiple elements, each of which elements is of a different glass 6. An objective lens according to claim 1, characterized by the fact that its structural data correspond to the values set forth in the following table:

Example I

| | Focal length | = 1.0 |
|---|---|---|
| | Back focus | = 0.4480 |
| | Structural length | = 0.8226 |
| | Relative aperture | = 1:6.3 |
| | Half of angular field | = 3.7° |

| Areas | Radii | Thicknesses | Lens | Part | Glass |
|---|---|---|---|---|---|
| 1 | .17329 | .012897 | 1 | | LaFN 8 |
| 2 | .13765 | .000512 | | 1 | |
| 3 | .13667 | .036726 | 2 | | fluorspar |
| 4 | −.48839 | .051843 | | | |
| 5 | −.25375 | .010078 | 3 | 2 | LaF 20 |
| 6 | 1.26255 | .140754 | | | |
| 7 | 1.35693 | .013153 | 4 | 3 | F 11 |
| 8 | −.29943 | .102149 | | | |
| 9 | −.16010 | .006491 | 5 | 4 | LF 8 |
| 10 | −.68992 | | | | |

| Lens | $P^{**}$ | $P^*$ | Glass range No. | Lens refractive powers × structural length for color d | Refractive power characteristics range |
|---|---|---|---|---|---|
| 1 | −1.9321 | 1.7489 | 1 | −.76516 | A |
| 2 | −1.7237 | 1.7873 | 2 | 3.282835 | B |
| 3 | −1.8623 | 1.7634 | 3 | −2.664285 | C |
| 4 | −2.0746 | 1.7289 | 4 | 2.076017 | D |
| 5 | −1.9217 | 1.7519 | 5 | −2.217200 | E |

7. An objective lens according to claim 1, characterized by the fact that its structural data correspond to the values set forth in the following table:

Example II

| | Focal length | = 1.0 |
|---|---|---|
| | Back focus | = .4926 |
| | Structural length | = .8875 |
| | Relative aperture | = 1:5.6 |
| | Half of angular field | = 8.5° |

| Areas | Radii | Thicknesses | Lens | Part | Glass |
|---|---|---|---|---|---|
| 1 | .20500 | .018213 | 1 | | LaFN 8 |
| 2 | .16759 | .006805 | | 1 | |
| 3 | .17248 | .044232 | 2 | | fluorspar |
| 4 | −.32723 | .008006 | | | |
| 5 | −.29588 | .013410 | 3 | 2 | LaF 20 |
| 6 | 1.48328 | .138501 | | | |
| 7 | −1.81388 | .030822 | 4 | | F 11 |
| 8 | −.30895 | .012609 | | 3 | |
| 9 | .51862 | .032824 | 5 | | LaF 20 |
| 10 | 2.21882 | .081259 | | | |
| 11 | −.20948 | .008206 | 6 | 4 | LF 8 |
| 12 | .83385 | | | | |

| Lens | $P^{**}$ | $P^*$ | Glass Range No. | Lens refractive powers × structural length for color d | Refractive power characteristics range |
|---|---|---|---|---|---|
| 1 | −1.9321 | 1.7489 | 1 | −.56798 | A |
| 2 | −1.7237 | 1.7873 | 2 | 3.317877 | B |
| 3 | −1.8623 | 1.7634 | 3 | −2.462950 | C |
| 4 | −2.0746 | 1.7289 | 4 | 1.491605 = $D_1$ | D |
| 5 | −1.8623 | 1.7634 | 3 | .901938 = $D_2$ | |
| 6 | −1.9217 | 1.7519 | 5 | −3.000638 | E | where $D_1 + D_2 = 2.393543 = D$.

8. An objective lens according to claim 1, characterized by the fact that its structural data correspond to the values set forth in the following table:

Example III

| | Focal length | = 1.0 |
|---|---|---|
| | Back focus | = .4018 |
| | Structural length | = .9793 |
| | Relative aperture | = 1:4 |
| | Half of angular field | = 8.5° |

| Areas | Radii | Thicknesses | Lens | Part | Glass |
|---|---|---|---|---|---|
| 1 | .27517 | .023522 | 1 | | LaFN 8 |
| 2 | .21699 | .005001 | | 1 | |
| 3 | .22659 | .069007 | 2 | | Fluorspar |
| 4 | −.42376 | .009281 | | | |
| 5 | −.40584 | .019002 | 3 | 2 | LaF 20 |
| 6 | 2.18543 | .200821 | | | |
| 7 | 1.33990 | .025403 | 4 | | TiF 5 |
| 8 | −.76456 | .075128 | | | |
| 9 | .15365 | .026163 | 5 | 3 | LaF 20 |
| 10 | .14714 | .027283 | | | |
| 11 | −.90101 | .018002 | 6 | | Fluorspar |
| 12 | −.27123 | .065287 | | | |
| 13 | −.17113 | .013601 | 7 | 4 | LF 8 |
| 14 | −1.26501 | | | | |

| Lens | $P^{**}$ | $P^*$ | Glass Range No. | Lens refractive powers × structural length for color d | Refractive power characteristics range |
|---|---|---|---|---|---|
| 1 | −1.9321 | 1.7489 | 1 | −.581383 | A |
| 2 | −1.7237 | 1.7873 | 2 | 2.785419 | B |
| 3 | −1.8623 | 1.7634 | 3 | −1.958457 | C |
| 4 | −2.1090 | 1.7213 | 4 | 1.187766 = $D_1$ | |
| 5 | −1.8623 | 1.7634 | 3 | .121210 = $D_2$ | D |
| 6 | −1.7237 | 1.7873 | 2 | 1.104415 = $D_3$ | |
| 7 | −1.9217 | 1.7519 | 5 | −2.780549 | E | where $D_1 + D_2 + D_3 = 2.413391 = D$.

9. An objective lens according to claim 1, characterized by the fact that its structural data correspond to the values set forth in the following table:

Example IV

| | Focal length | = 1.0000 |
|---|---|---|
| | Back focus | = 0.05077 |
| | Structural length | = 0.8477 |
| | Relative aperture | = 1:5.6 |
| | Half of angular field | = 5.4° |

| Area | Radii | Thicknesses | Lens | Part | Glass |
|---|---|---|---|---|---|
| 1 | .19218 | .014321 | 1 | | LaFN 8 |
| 2 | 1.14620 | .000326 | | 1 | |
| 3 | .14516 | .043891 | 2 | | Fluorspar |
| 4 | −.57788 | .050863 | | | |
| 5 | −.29807 | .013293 | 3 | 2 | LaF 20 |
| 6 | 2.73377 | .124650 | | | |
| 7 | 3.64420 | .016052 | 4 | | TiF 5 |
| 8 | −.29384 | .005142 | | 3 | |
| 9 | .78186 | .014622 | 5 | | LaF 20 |
| 10 | −1.13650 | .049158 | | | |
| 11 | −.22127 | .007650 | 6 | 4 | LF 8 |
| 12 | .37257 | | | | |

| Lens | $P^{**}$ | $P^*$ | Glass Range No. | Lens refractive powers × structural length for color d | Refractive power characteristics range |
|---|---|---|---|---|---|
| 1 | −1.9321 | 1.7489 | 1 | −.885184 | A |
| 2 | −1.7237 | 1.7873 | 2 | +3.111989 | B |
| 3 | −1.8623 | 1.7634 | 3 | −2.156420 | C |
| 4 | −2.1090 | 1.7213 | 4 | +1.846159 = $D_1$ | |
| 5 | −1.8623 | 1.7634 | 3 | +1.245144 = $D_2$ | D |
| 6 | −1.9217 | 1.7519 | 5 | −3.462688 | E | where $D_1 + D_2 = +3.091303 = D$.

10. An objective lens according to claim 1, characterized by the fact that its structural data correspond to the values set forth in the following table:

Example V

| | | |
|---|---|---|
| Focal length | = 1.0 | |
| Back focus | = 0.4093 | |
| Structural length | = 0.9789 | |
| Relative aperture | = 1:4 | |
| Half of angular field | = 8.6° | |

| Areas | Radii | Thicknesses | Lens | Part | Glass |
|---|---|---|---|---|---|
| 1 | 0.27154 | 0.021381 | 1 | | LaFN 8 |
| 2 | 0.21111 | 0.003631 | | 1 | |
| 3 | 0.22042 | 0.069386 | 2 | | Fluorspar |
| 4 | −0.40340 | 0.005244 | | | |
| 5 | −0.40340 | 0.017750 | 3 | 2 | LaF 20 |
| 6 | 1.49484 | 0.186375 | | | |
| 7 | 0.79339 | 0.026625 | 4 | | F 11 |
| 8 | −1.04285 | 0.083909 | | | |
| 9 | 0.15271 | 0.023398 | 5 | 3 | LaF 20 |
| 10 | 0.14417 | 0.035500 | | | |
| 11 | −1.10470 | 0.022591 | 6 | | Fluorspar |
| 12 | −0.26961 | 0.063739 | | | |
| 13 | −0.17762 | 0.010085 | 7 | 4 | LF 8 |
| 14 | −2.47314 | | | | |

| Lens | P** | P* | Glass Range No. | Lens refractive powers × structural length for color d | Refractive power characteristics range |
|---|---|---|---|---|---|
| 1 | −1.9321 | 1.7489 | 1 | −0.644957 | A |
| 2 | −1.7237 | 1.7873 | 2 | 2.879380 | B |
| 3 | −1.8623 | 1.7634 | 3 | −2.111017 | C |
| 4 | −2.0746 | 1.7289 | 4 | $1.341541 = D_1$ | |
| 5 | −1.8623 | 1.7623 | 3 | $0.028855 = D_2$ | D |
| 6 | −1.7237 | 1.7873 | 2 | $1.200551 = D_3$ | |
| 7 | −1.9217 | 1.7519 | 5 | −2.882731 | E | where $D_1+D_2+D_3 = 2.570947 = D$.

11. An objective lens according to claim 1, in which one of the parts of the objective lens comprises at least three elements, each of which elements is of a different glass.

* * * * *